United States Patent [19]

Harris

[11] Patent Number: 4,838,079
[45] Date of Patent: Jun. 13, 1989

[54] MULTI-CHANNEL PIPE FOR MONITORING GROUNDWATER

[76] Inventor: Richard K. Harris, 4123 55th Ave. SW., Seattle, Wash. 98116

[21] Appl. No.: 52,587

[22] Filed: May 20, 1987

[51] Int. Cl.⁴ .................... E21B 47/06; E21B 49/00
[52] U.S. Cl. ................................ 73/155; 73/863.33; 166/127
[58] Field of Search ............. 73/290 R, 155, 864.63, 73/863.33; 166/191, 264, 192; 116/227

[56] References Cited

U.S. PATENT DOCUMENTS

| | | | |
|---|---|---|---|
| 3,424,246 | 1/1969 | Myers | 166/127 |
| 3,537,485 | 11/1970 | March | 138/115 |
| 4,484,626 | 11/1984 | Kerfoot et al. | 73/155 X |
| 4,538,683 | 9/1985 | Chulick | 166/264 |
| 4,669,554 | 6/1987 | Cordy | 73/155 X |

Primary Examiner—Daniel M. Yasich
Attorney, Agent, or Firm—Garrison and Stratton

[57] ABSTRACT

A multi-channel pipe for monitoring groundwater in aquifers at multiple levels below a single site. Pipe sections each comprise an outer wall, an interior element dividing the pipe into multiple channels, a monitoring port opening into one of the channels, coupling means for joining pipe sections lengthwise to each other, and a plug for plugging the channel immediately below the monitoring ports. The interior element is preferably star-shaped, having a hollow cylindrical central core and eight radial segments affixed between the core and the outer wall. Each channel is defined in part by the outer wall and in part by two adjacent segments of the interior element. Corresponding channels of adjacent pipe sections are joined by couplings each channel receiving one end of a coupling. A capped plug is inserted into the upper end of the coupling below immediately above the monitoring ports of a channel. An inflatable packer encircling the pipe seals the drill hole between groups of monitoring ports. Each packer is inflated through an inflation port opening into a selected one of the channels of the pipe, designated the inflation channel. Check valve membranes covering the inflation ports prevent backflow from the packers into the inflation channel.

12 Claims, 2 Drawing Sheets

MULTI-CHANNEL PIPE FOR MONITORING GROUNDWATER

BACKGROUND OF THE INVENTION

1. Technical Field

This invention relates to pipes. More particularly, it relates to pipes for monitoring groundwater and the like at multiple levels below a single site on the surface of the ground

2. Description of the Prior Art

There are many situations where it is necessary to monitor groundwater in aquifers at multiple levels below the surface. For example, improperly constructed toxic waste storage sites can contaminate groundwater below the site as rain percolating through the earth leaches toxic substances from the dumped materials. Successful confinement of contaminated groundwater requires ongoing monitoring of the quality, quantity and movement of the water. One method of accurately monitoring multiple groundwater levels below a single site on the surface of the ground is to sink separate drill holes to each of the desired levels and install single channel pipes in each hole. Monitoring instruments, such as for sampling ground water, testing permeability, injecting tracers, or measuring water pressure, can then be lowered into the respective pipes for monitoring one of the aquifers as desired. Flow of groundwater up or down the drill holes between aquifers can be prevented by filling all but the deepest portion of each hole with a bentonite or grout sealing compound. A major disadvantage of this multiple hole method is that it requires a great deal of drilling, which is very expensive and time consuming.

A second method for monitoring groundwater at multiple levels below a site involves sinking a single large diameter drill hole to the deepest level to be monitored, and placing multiple single channel pipes of varying lengths into the hole, each pipe terminating at one of the levels to be monitored. The drill hole is backfilled with alternate layers of sand and sealing compound, the sand surrounding the open end of each monitoring pipe where groundwater is to be sampled, and the sealing compound sealing the drill hole between the monitored levels. The disadvantage of this second method is that it requires an expensive large diameter hole, and precise delicate backfilling of the hole to seal the monitored levels from each other without damaging or dislodging the pipes.

The third method for monitoring groundwater at multiple levels a site involves placing a bundle of tubes contained within a pipe casing into a single, smaller diameter drill hole extending to the deepest level of the site to be monitored. Each tube extends to a different depth in the casing, so that water can be drawn from different depths in the drill hole. The interval of drill hole associated with each tube is isolated from above and below by packers that expand so that the annular space between the casing and the wall of the bore hole is sealed over specified intervals. Each of the lengths of tubing within the casing extends continuously from its respective sampling port up to the top of the casing. Thus, each tube must be cut to length during assembly of the device. The casing is divided into sections of manageable length which are coupled together and lowered into the drill hole. As each section of the casing is lowered into the drill hole, the bundle of tubes extending therefrom must be carefully guided through the next section of casing to be placed in the drill hole. Thus, this third method requires exacting, time consuming and correspondingly expensive installation and assembly at the site of the drill hole. Furthermore, the use of separate tubes within the casing requires that each tube be of relatively small diameter, thus limiting the size of monitoring instruments which can be lowered down the tubes.

SUMMARY OF THE INVENTION

It is thus an object of the present invention to provide a pipe assembly for monitoring groundwater at multiple levels below a single site using a only single, relatively small diameter drill hole.

It is a further object of this invention to provide a pipe assembly for monitoring groundwater at multiple levels which does not require elaborate backfilling.

It is another object of this invention to provide a pipe assembly for monitoring groundwater at multiple levels which can be readily assembled from and disassembled into pipe sections of convenient length.

These and other objects are provided by a multi-channel pipe assembly for monitoring groundwater and the like comprising a longitudinally extending outer wall defining an interior volume, a longitudinally extending interior element dividing the interior volume into multiple continuous channels defined in part by the outer wall, a monitoring port opening through the outer wall into a selected one of the channels, and means for plugging the selected channel below the monitoring port thereof.

DETAILED DESCRIPTION OF THE PREFERRED EMBODIMENT

Figures 1, 2:
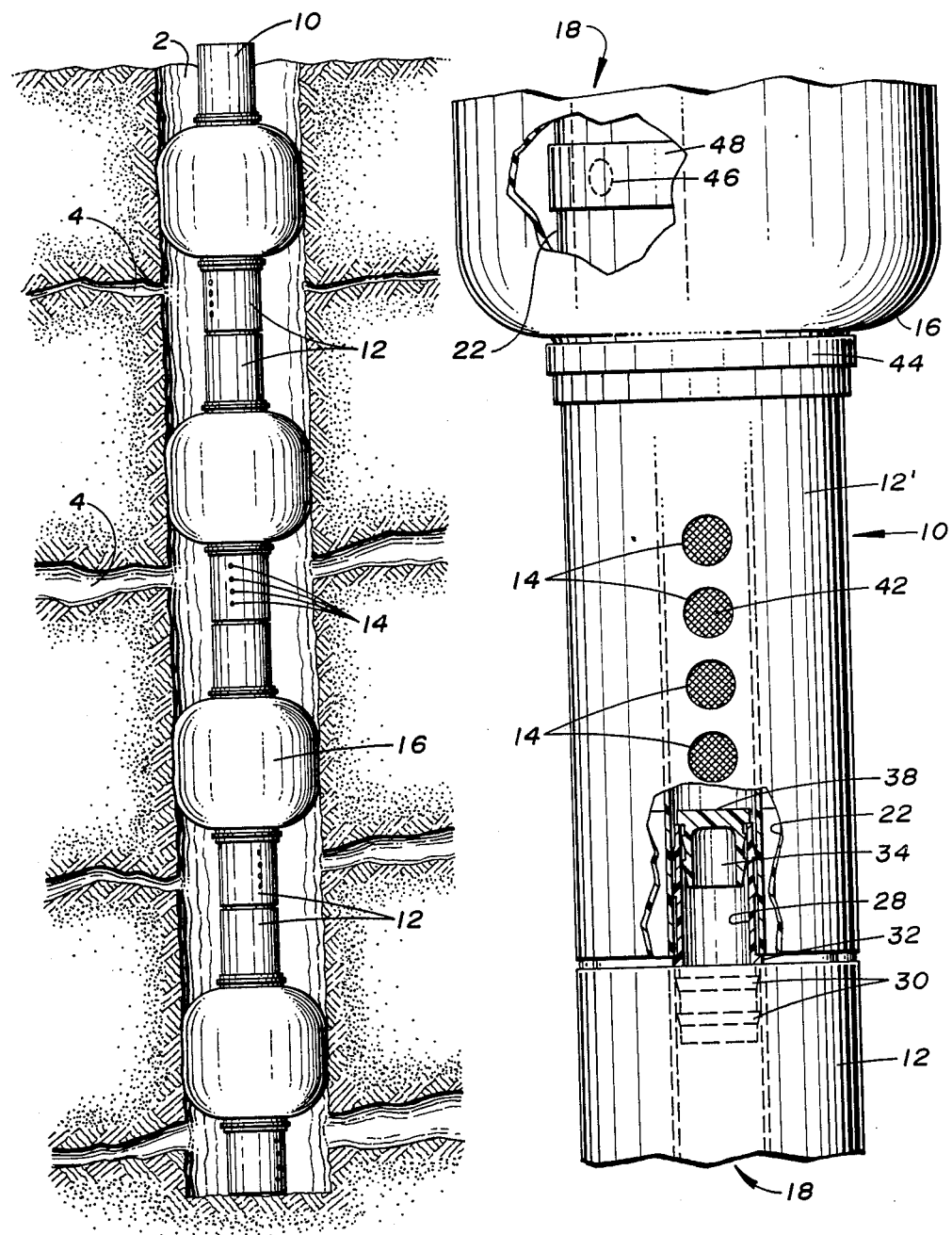
FIG. 1 is a side elevational view of a multi-channel pipe according to the present invention placed in the drill hole.
FIG. 2 is a side elevational, partially cutaway view of portions of two coupled sections of the pipe of FIG. 1, showing the inflated packer, the monitoring ports, and the plugged coupling in cross-section.

As seen in FIG. 1 the multi-channel pipe 10 of the present invention in operation is placed in a drill hole 2 sunk through multiple subsurface aquifers 4 in which groundwater is to be monitored. The pipe 10 is formed from pipe sections 12 for ease of handling. Groups of monitoring ports 14 in the pipe 10 are located at the level of each aquifer 4 when the pipe 10 is in place in the hole 2. Groundwater from an aquifer 4 flows through its respective monitoring ports 14 into the pipe 10 where it be sampled, measured or otherwise monitored. Inflatable packers 16 supported on the pipe 10 seal the drill hole 2 around the pipe between adjacent groups of the monitoring ports 14 to prevent groundwater from flowing upward or downward within the drill hole. Each group of monitoring ports 14 opens into a respective channel 18 within the multi-channel pipe 10.

The pipe 10 is formed from multiple, substantially identical pipe sections 12. The pipe sections 12 are formed as integral elements from continuously extruded polyethylene. For purposes of description, the integral pipe can be considered as comprising an interior element 20 and an outer wall 22.

Figure 3:
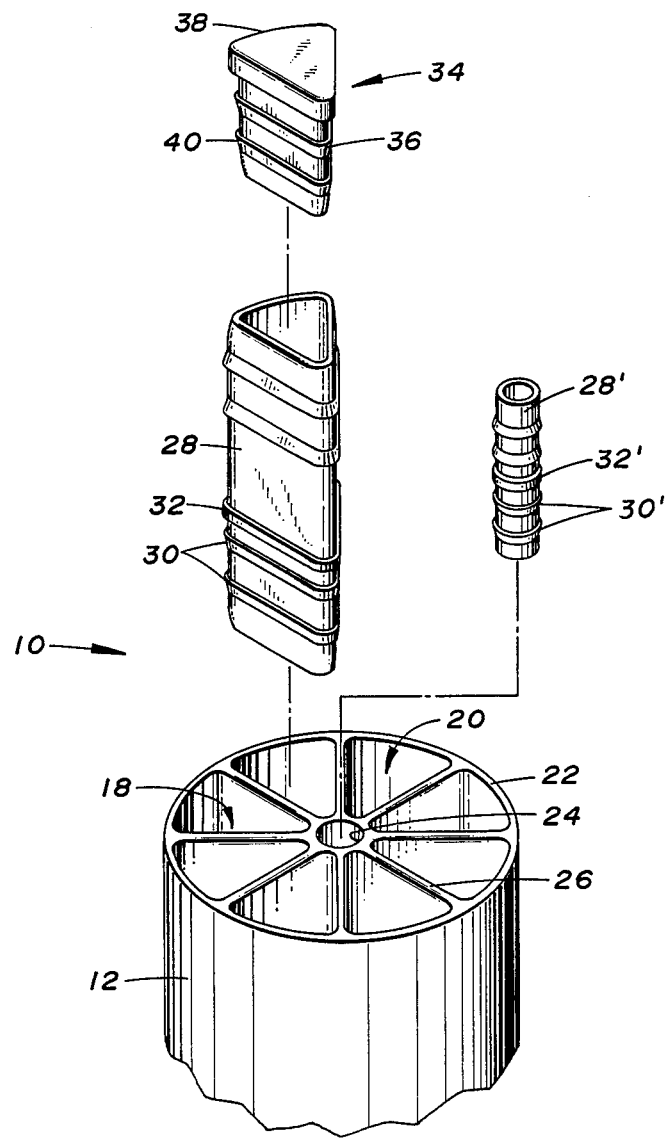
FIG. 3 is an exploded isometric detail of a portion of the pipe section of FIG. 2, showing the coupling and the plug.

Referring now to FIG. 3, the pipe 10 is divided into eight longitudinally extending channels 18 by the star-shaped interior element 20, although it is contemplated that the pipe can be configured with a different number or arrangement of channels by a suitably shaped interior element. The interior element 20 is positioned coaxially within the rigid cylindrical outer wall 22. The interior element 20 comprises a hollow, substantially cylindrical central core 24 coaxial with the outer wall 22, and eight segments 26 affixed o and extending radially between the core and the outer wall. The interior element 20 and the outer wall 22 thus together define the eight longitudinally extending channels 18 within the pipe 10. Each channel 18 can be used to monitor groundwater in the drill hole 2 at a selected level below the surface.

The pipe 10 is formed from pipe sections 12, 12' coupled lengthwise to each other. Adjacent pipe sections 12, 12' are coupled to each other by means of eight elongated, hollow, wedge-shaped polyethylene channel couplings 28 and an elongated, hollow, substantially cylindrical polyethylene core coupling 28'. Each channel coupling 28 is inserted at one end into a selected channel 18 of the first pipe section 12, and the opposite end of the coupling is inserted into the corresponding channel of the second pipe section 12'. The channel couplings 28 are shaped to be received snugly within the channels 18. Two sealing ribs 30 extend around each end of each channel coupling 28 to seal the space between the coupling and the channel 18 in which the coupling is placed. The core coupling 28' is inserted in one end into the hollow cylindrical core 24 of the first pipe section 12, and the opposite end of the core coupling is inserted into the hollow cylindrical core of the second pipe section 12'. The core coupling 28' is shaped to be received snugly within the hollow core 24. Two sealing ribs 30' extend around each end of the core coupling 28' to seal the space between the core coupling and the wall of the core 24.

A spacer flange 32 extending around the channel coupling 28 substantially at its one-third point positions the coupling between the first and second pipe sections, 12, 12' when the pipe sections are coupled together. Along an outer portion of the channel coupling 28 adjacent the outer wall 22, the spacer flange 32 extends outwardly from the coupling for a distance approximately equal to the thickness of the outer wall. Adjacent a radial segment 26 of the interior element 20, the spacer flange 32 extends outwardly from the channel coupling 28 for a distance less than or equal to one half the thickness of the radial segment. A similar spacer flange 32' extends around the core coupling 28'.

Each of the channels 18 in the multi-channel pipe 10 extends uninterruptedly through the pipe sections 12 and channel couplings 28 between them from the ground surface to the bottom of the drill hole 2. Each channel 18 is used for monitoring the groundwater of one of the aquifers 4 at that aquifer's level below the surface. When the pipe 10 is in place in the drill hole 2, a group of four monitoring ports 14 extends through the outer wall 22 into a selected one of the channels 18 at the level of an aquifer 4 which is to be monitored. If one channel 18 is to be used to monitor groundwater at more than one level, additional groups of monitoring ports 14 may be provided opening into that channel at each such level. Otherwise, each channel 18 communicates with only one group of monitoring ports. It will be understood that while each group of monitoring ports is described as comprising four monitoring ports 14, a single monitoring port or a different number of monitoring ports may instead be provided for each aquifer 4.

Each channel 18 is plugged below its monitoring ports 14 to prevent leakage into or out of the channel from aquifers other than the adjacent aquifer 4 to be monitored. As presently preferred, the channels 18 are plugged by a polyethylene plug 34 inserted into the coupling 28 in each channel closely below its monitoring ports 14. As seen in FIG. 3, the plug 34 includes a hollow elongated wall 36 of substantially wedge-shaped cross-section sized to fit within the channel coupling 28. A cap 38 affixed perpendicularly to the plug wall 36 at one end thereof completely covers one end of the plug 34. The plug cap 38 extends outwardly beyond the outer surface of the plug wall 36 for a distance approximately equal to the thickness of the channel coupling 28. When the open end of the plug 34 is fully inserted into the hollow coupling 28, the plug cap 38 extends over and positively seals the entire end of the coupling. Like the coupling 28, the plug 34 includes sealing ribs 40 encircling the wall 36 at the open end of the plug to seal the space between the plug wall 36 and the coupling when the plug is in place.

The monitoring ports 14 are covered on the interior of the channel 18 by a polyethylene filter screen 42 to prevent the channel from being filled with particles of clay, sand or the like.

To properly monitor each aquifer 4, groundwater flow up or down the drill hole 2 between the aquifers must be prevented. This is preferably accomplished by providing inflatable packers 16 supported on and encircling the pipe 10 between the groups of monitoring ports 14. When the pipe 10 is being placed in the drill hole 2, the packers 16 are left uninflated. Once the pipe 10 is in place the packers 16 are inflated, sealing the drill hole 2 between each aquifer 4 and each group of monitoring ports 14 as shown in FIG. 1. The packers 16 are substantially cylindrical flexible membranes. Steel bands 44 tightly encircle the upper and lower ends of each packer 16, sealing the packer around the outer wall 22 of the pipe 10. Because the present invention provides multiple channels 18 extending the length of the pipe 10, one of these channels 18' may advantageously be used to inflate the packers 16. Inflation ports 46 open through the outer wall 22 of the pipe 10 where it is covered by the packer 16, communicating between the inflation channel 18' and the sealed space between the packer 16 and the pipe 10. Alternatively, the hollow central core 24 may be used to inflate the packers 16.

The packers 16 are simultaneously inflated by pressurizing the inflation channel 18'. A flexible check valve membrane 48 encircles the pipe 10 between the pipe and the packer 16, covering the inflation port 46. When the inflation channel 18' is pressurized, the membrane 48 is forced away from the inflation port 46, allowing flow from the inflation channel 18' to inflate the packer 16. When the packer 16 is fully inflated and the inflation channel 18' is depressurized, the membrane 48 is positively held in place over the inflation port 46 by the pressure within the packer 16, thereby preventing backflow into the inflation channel. The membrane 48 thus acts as a check valve allowing the flow from the inflation channel 18' into the packer 16 while preventing backflow in the opposite direction.

When the multi-channel pipe 10 is in place in the drill hole 2, the groundwater in a selected one of the aquifers 4 is monitored by lowering a suitable monitoring instrument, such as a sampler or pressure gauge, down the channel 18 which has its group of monitoring ports 14 adjacent the selected aquifer 4. The instrument is lowered into the channel 18 until further downward progress is prevented by the plug 34 located closely below the monitoring ports 14 of the channel. The instrument is thus positioned adjacent the monitoring ports 14 so as to best monitor the groundwater in the aquifer 4. The eight channel pipe 10 of the presently preferred embodiment is thus capable of monitoring seven aquifers 4 while using the eighth channel as the inflation channel 18′.

It will be appreciated that, although specific embodiments of the invention have been described for purposes of illustration, various modifications may be made without departing from the spirit and scope of the invention. In particular, other coupling means may be used to join the pipe sections to each other to form the pipe. Also, the packers 16 can be eliminated by back filling the drill hole according to the method described above, thus freeing all eight channels 18 for use in monitoring aquifers. Alternative means for plugging the channels 18 immediately below their monitoring ports 14 are also contemplated. The multi-channel pipe of this invention is not limited to use in monitoring ground water, but is also well-suited to any application requiring access to multiple levels to the surface, including underground gas monitoring, and injection of tracers or other substances into groundwater. Finally, it is contemplated that the pipe may be fabricated from other materials besides polyethylene, including polyvinyl chloride (PVC), polypropylene, synthetic resin polymers and products including the products sold under the trademark Teflon, and stainless steel, depending on the use to which the pipe is to be put. Accordingly, the scope of the invention is not limited except as by the following claims:

I claim:

1. A multi-channel pipe for monitoring groundwater and the like at one or more subsurface aquifer levels, said multi-channel pipe comprising:
    a longitudinally extending outer wall defining an interior volume;
    a longitudinally extending interior element further comprising a central core coaxial with the outer wall and radial segments extending between the core and outer wall, said interior element dividing the interior volume into multiple continuous channels defined in part by the outer wall, wherein at least two of the continuous channels each include a monitoring port opening through the outer wall, each of said two channels having its monitoring port at an aquifer level different from the aquifer level of other channels, so that each channel communicates between the surface and its own aquifer level; and
    means for plugging each of said two channels below the respective monitoring port of each channel.

2. A multi-channel pipe according to claim 1, wherein the monitoring port is covered with a filter.

3. A multi-channel pipe according to claim 1, wherein the interior element divides the pipe into eight channels.

4. A multi-channel pipe according to claim 1, further including means for coupling sections of pipe lengthwise to each other.

5. A multi-channel pipe according to claim 4, wherein the coupling means comprises a separate element between the pipe sections.

6. A multi-channel pipe according to claim 5, where the coupling means comprises a plurality of hollow couplings, each coupling having a first end sealingly insertable into a channel of one pipe section, and an opposite end sealingly insertable into a corresponding channel of a second pipe section.

7. A multi-channel pipe according to claim 6, wherein the plugging means comprises a plug insertable into one of the couplings.

8. A multi-channel pipe according to claim 1, further comprising:
    an inflatable packer supported on the pipe and capable of sealing a drill hole around the pipe when inflated, and
    means for inflating the packer when the pipe is placed in the drill hole.

9. A multi-channel pipe according to claim 8, wherein the packer comprises a circumferential flexible membrane encircling the pipe and attached thereto by circumferential bands.

10. A multi-channel pipe according to claim 9, wherein the inflating means comprises one of the channels of the pipe and an inflation port communicating with the channel of the inflating means.

11. A multi-channel pipe according to claim 10, wherein the inflating means further comprises check valve means for preventing deflation of the packer.

12. A multi-channel pipe according to claim 11, wherein the check valve means comprises a circumferential flexible membrane arranged between the outer wall and the packer and covering the inflation port.

* * * * *